W. R. H. CAPEWELL.
VALVE.
APPLICATION FILED NOV. 17, 1919.
1,380,307.
Patented May 31, 1921.
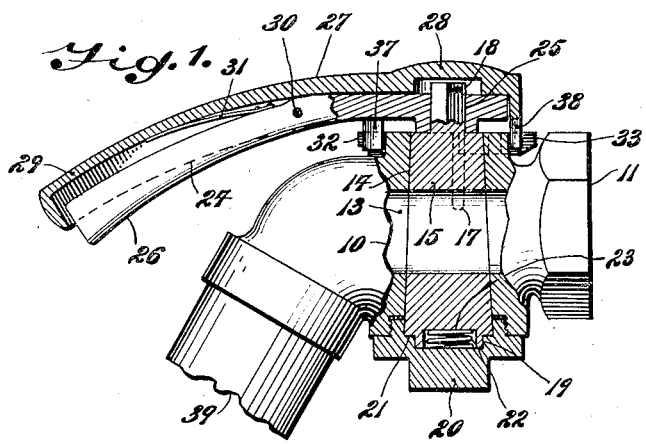
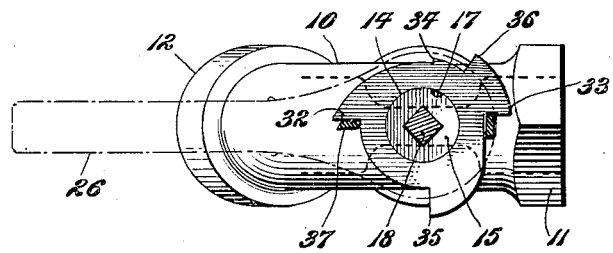
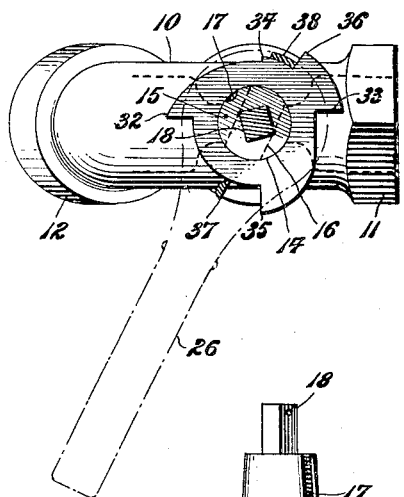
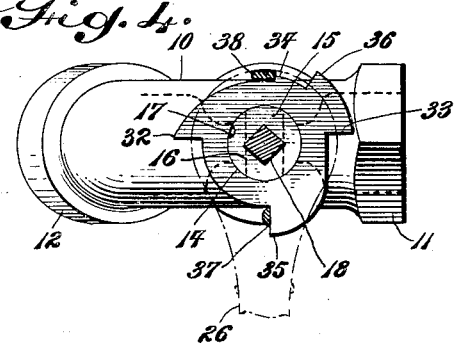
WITNESS:
Alfred T. Bratton
William R. H. Capewell,
INVENTOR.
BY
Victor J. Evans
ATTORNEY.

UNITED STATES PATENT OFFICE.

WILLIAM R. H. CAPEWELL, OF JAMESBURG, NEW JERSEY, ASSIGNOR OF ONE-FOURTH TO WILLIAM HEINRICH, OF MERCHANTVILLE, NEW JERSEY.

VALVE.

1,380,307.  Specification of Letters Patent.  Patented May 31, 1921.

Application filed November 17, 1919. Serial No. 338,702.

*To all whom it may concern:*

Be it known that I, WILLIAM R. H. CAPEWELL, a citizen of the United States, residing at Jamesburg, in the county of Middlesex and State of New Jersey, have invented new and useful Improvements in Valves, of which the following is a specification.

The invention relates to valves and more particularly to air line valves such as are generally found in connection with air brake systems on rolling stock and has for an object to provide an improved form of valve which can be easily operated; in which various of the parts are protected from the elements, preventing them from rusting tight, and in which the valve can be moved from an open to a closed or intermediate position for opening the train line, closing the train line or closing the line for a particular car, permitting the bleeding of the air from the hose couplings thereof.

In the further disclosure of the invention reference is to be had to the accompanying drawings, constituting a part of this specification, in which similar characters of reference denote corresponding parts in all the views, and in which,—

Figure 1— is a fragmentary side elevation of the valve with the valve proper shown in open position, parts being broken away to disclose the underlying structure.

Fig. 2— is a fragmentary plan view with a portion of the operating handle shown in full lines in section and in dotted lines, the position of the valve being substantially the same as in Fig. 1.

Fig. 3— is a similar view showing the valve closed.

Fig. 4— is a similar view showing the valve closed with the bleed opening in open position, and Fig. 5— is a perspective view of the valve proper.

Referring more particularly to the views I provide a body 10 having a coupling end 11 and an offset end 12, the body being substantially tubular as shown at 13 and having a vertical bore 14 for the insertion of a tapered valve proper or plug 15, the latter having a horizontal passage 16 therethrough and provided with a bleed groove 17 extending vertically on its periphery, a suitable squared shank 18 projecting upwardly from the body of the plug and a depending reduced seat member 19 extending from the bottom of the plug. The valve proper or plug is inserted into the body 10 from the bottom and is held in place by a headed securing element 20 formed with a seat 21 for the member 19, a suitable expansible helical spring 22 being seated in a cut out portion 23 in the underside of the valve proper or plug and bearing against the inner face of the element 20, said seat serving to hold the valve proper or plug in position. The shank 18 it will be seen, projects beyond the upper portion of the body 10 to receive an operating element 24 having a squared portion 25 receiving the shank 18 with the handle portion indicated by the numeral 26. It will be apparent that by imparting pressure to the handle portion 26, the valve proper will be rotated within the body 10 as will be hereinafter more fully described. A protective cover or hood 27 is provided for the handle and includes a hollow head 28 and handle cover 29 shaped to the contour of the handle 26 and substantially covering the same with the covering pivoted on the handle 26 by a cross pin 30 so that when a downward pressure is imparted to the handle end of the covering the head end 28 will be raised. It will be seen that the handle end of the covering is normally held away from the covering 26 by a flat spring 31 secured to the handle 26 and bearing against the underside of the handle covering as shown, and it will be apparent that the covering protects the end handled structure against the intrusion of water so as to prevent rusting of the parts.

The upper central portion of the body 10 is formed to provide a plurality of positioning and stopping lugs 32, 33, 34, 35, and an intermediate projecting lug or face 36. The handle 26 furthermore is provided with a depending finger 37 and the head 28 of the covering with a depending finger 38.

Now referring to Figs. 1, 2, it will be seen that when the fingers 37, 38 are in the position shown in these views they will abut against the flanges 32, 33, and thus lock the handle against movement, also locking the covering, the valve proper 15 at this time being in open position with its passage 16 in register with the passage of the body 10. Assuming that the coupling end 11 is connected directly with the train line and that the coupling end 12 has the usual coupling hose 39 connected thereto which serves to connect the air line with the next adjacent car, it will be apparent that when a downward pressure is exerted on the handle covering 29 and the same moved toward the right, the resulting upward movement of the head 28 will remove the finger 38 from the flange 33 so that the turning of the valve can be accomplished, bringing the handle to the intermediate position shown in Fig. 3. When the downward pressure on the handle covering 29 is now released the finger 38 will engage against the flange 36 and at this time it will be seen that the valve proper will be closed, its passage 16 being out of register with the passage 13 of the body, this position of the valve closing the air line of the particular car in which the valve is located and at that end thereof. It will be noted by reference to Fig. 3 that the bleed opening or groove 17 will still be out of register with the passage 13 of the body and will not be brought into register with the passage until the handle is moved to the position shown in Fig. 4. When the handle is moved to the position shown in Fig. 4 the action of the spring 31 will cause the finger 38 to abut against the flange 34 and the finger 37 abutting against the flange 35, it will be apparent that the handle, the handle covering and the valve proper will be locked in positions at right angles to the body 10 and the passage therethrough, the valve being still closed as to the train line. It will be apparent however that the bleed opening formed by the groove 17 will now register with that portion of the passage formed by the coupling end 12 and thus the air in the coupling hose 39 can pass out through the bleed opening without disturbing the air contained in the air line of the car in which the valve is mounted.

By having the bleed opening arranged to lie beneath the head 38, the admission of rain water to the valve proper will be prevented and the opening will be substantially protected from becoming clogged up and rendered unfit to accomplish its purpose.

From the foregoing description it will be apparent that the device described is of a simple construction; that the handle for operating the valve is well protected by the covering which is a necessary adjunct to the operation of the device and that the entire upper part of the valve proper and the handle will be kept in position for operation and not become rusted or corroded by reason of the protective covering provided.

Having described my invention, I claim,—

1. An air line valve comprising a body formed with a passage and a plurality of coupling ends and having a vertical bore therein traversing said passage, a valve proper provided with a cross passage and a vertical groove on the periphery, said groove with said body forming a bleed opening, means for movably seating said valve proper in said body, a handle having connection with a valve at the upper end thereof and disposed to operate the valve when the handle is operated to move the valve from an open to a closed or intermediate position relative to said body, the closed position of the valve registering the bleed opening with a passage of one of the coupling ends of the body, a handle covering pivoted on the handle and having the handle lying substantially within the same, a spring normally spacing one end of the handle covering from one end of the handle positioning stop flanges projecting from the body, a finger depending from the handle to engage with certain of said flanges and a second finger projecting from the covering to engage with other of said flanges, the engagement of said fingers with said flanges locking said handle and covering in different positions relative to said body.

2. An air line valve comprising a casing formed with a passage and a vertical bore, a valve proper formed with a passage and a vertical groove on its periphery, said valve fitting the bore of the body with its passage alining with the passage of the body and the groove in the valve proper with said body forming a bleed opening, a handle for actuating said valve in said body to bring the passage of the valve proper into or out of registration with the passage of the body and the groove of the valve proper into or out of registration with the passage of the body, a spring engaged covering for the handle flanges projecting from the body and fingers, one on the handle and one on the covering, said fingers in cooperation with said flanges being adapted to lock the handle and covering in different positions relative to said body.

3. A valve of the character described comprising a case, a valve plug rotatably fitted therein, a handle projecting from said valve plug, said casing having a plurality of shoulders at its upper end equi-distantly spaced, an additional shoulder arranged between certain of the aforementioned shoulders, a lug depending from the said handle and adapted to engage the first mentioned shoulders to prevent accidental movement of the valve from one position to another, a covering element for said handle, said element being pivoted on the handle at a point between its ends, and a finger depending from said covering and adapted to contact any of said shoulders for the purpose specified.

In testimony whereof, I affix my signature.

WILLIAM R. H. CAPEWELL.